3,327,021
POLYMER CRYSTALLIZATION METHOD
Frederick L. Binsbergen, Amsterdam, Netherlands, assignor to Shell Oil Company, New York, N.Y., a corporation of Delaware
No Drawing. Filed May 25, 1964, Ser. No. 370,081
Claims priority, application Netherlands, May 30, 1963, 239,399
15 Claims. (Cl. 260—878)

This invention relates to an improved crystallization method for the production of composites of solid crystalline polymers with crystallization modifying additives. The method leads to the production of modified polymers having improved physical properties.

The invention relates more specifically to an improvement in a crystallization method for the production of shaped articles and of resin composites suitable for use in producing shaped articles, from resins consisting substantially of crystallizable olefin polymers, particularly those produced from alpha-monoolefins in the presence of low pressure catalysts of the Ziegler-Natta type. The invention is of outstanding advantage when used with isotactic polypropylene and will be illustrated largely with reference thereto.

Solid polypropylene is a new thermoplastic polymer which has recently achieved commercial importance. By use of appropriate conditions and catalysts it can be produced in a sterically regulated form known as isotactic polypropylene. It is difficult if not impossible, to polymerize propylene to a polymer which has 100% isotactic structure. However, it is possible to produce, with commercially practical catalysts, polymers which have a high proportion of segments that are completely isotactic. A property which is associated with isotacticity of polypropylene is the capacity of a melt thereof to solidify in crystalline form.

Following conventional terminology, reference to "crystalline" polymers means, unless the context indicates otherwise, solid polymers having a high degree of crystallinity, at least 50% as determined by X-ray analysis or comparable methods. In general, polyproylene having a crystallinity of this order contains at most only a very small proportion of material which is extractable in non-aromatic hydrocarbon such as gasoline boiling range hydrocarbons. Typically, the proportion of highly crystalline polypropylene which is extractable in boiling heptane or isooctane is less than 10% and usually less than 5%. Similarly, "crystallizable" polymers are those which have a molecular arrangement that enables them to solidify from a melt in a highly crystalline structure. The general practice in the art is to refer to "crystalline" or "crystallizable" polymer, rather than "partially crystalline" or "partially crystallizable" polymer even though olefin polymers of 100 percent crystal structure are not known to exist. For example, a crystallinity of 70% is extremely high for isotactic polypropylene. Normally solid, crystalline polypropylene usually has a viscosity average molecular weight of at least about 40,000 and generally between 100,000 and 1,200,000. For convenience the molecular weight is usually expressed in terms of intrinsic viscosity. The intrinsic viscosity of polypropylene, measured in Decalin at 150° C., is generally between 1.0 and 6 dl./g. but may be as low as 0.5 or less and as high as 10 or more.

Reference to "polymers" herein includes both homopolymers and copolymers unless the context indicates otherwise.

Crystalline polymers, in their usual form, have some outstandingly good properties and some undesirable ones. For example, desirable properties of highly crystalline polypropylene are high tensile strength and substantial hardness. One disadvantage of the usual forms of highly crystalline polypropylene is a lack of transparency or clarity, which shows up as haze in thin films and as translucency, decreasing to ultimate opacity, in articles of progressively increased thickness. Another disadvantage of the usual forms of highly crystalline polypropylene is a relatively low impact resistance. This handicaps the use of isotactic polypropylene for making vessels or containers which during use may be subject to mechanical shock.

Polypropylene, like many other crystalline polymers, crystallizes from a melt in a form in which the individual crystals are associated in spheroid or ellipsoid bodies known as spherulites. Generally, clarity and some mechanical properties of articles made from polypropylene are better when the spherulites are relatively small.

It has been proposed to add a variety of materials to polyolefins to improve polymer properties related to the rate of crystallite and spherulite growth.

It has now been found that alkali metal salts of certain monosulfonic acids can be used as polymer additives to modify the crystallization process and thereby provide substantial improvements in physical properties of solid polypropylene and in mechanical properties of articles produced therefrom, especially those properties which are related to crystallite and spherulite structure of the polymer. Similar improvements of other crystallizable polymers may be obtained by use of additives of the same type. In many instances minute amounts of the additives are extremely effective in modifying the crystallization process and crystal structure.

The preferred materials which result in the production of solid polypropylene of improved physical properties when used according to this invention are sodium salts of sulfonic and aminosulfonic acids. Effective compounds of this type are identified in detail hereinafter.

The improvements of this invention are obtained when a compound such as one of said sodium salts of monosulfonic acids is present in dissolved or thoroughly dispersed form in the polymer melt prior to the final crystallization thereof by cooling.

It is a specific object of this invention to provide an improved crystallization method for the production of composites of polypropylene with crystallization modifying additives.

It is another specific object of this invention to provide articles of crystalline polypropylene which, by virtue of an improved crystal structure, have improved mechanical properties and clarity.

It is another object to provide an improved crystallization method for the production of composites of crystallizable polymers, such as linear polymers of alpha-monoolefins, with crystallization modifying additives.

Another object is to provide articles of crystalline polymers such as linear polymers of alpha-monolefins which, by virtue of an improved crystal structure, have improved mechanical properties and clarity.

It is a major object of this invention to provide a novel method for causing crystallizable polypropylene to crystallize with a very fine spherulite structure.

Another object is to provide a novel method for causing crystallizable polymers to crystallize with a very fine spherulite structure.

Other objects will become apparent from the following description of this invention.

According to this invention, solid crystalline polypropylene and other similar solid crystalline polymers of substantially improved physical properties are prepared by carrying out at least the final crystallization from a melt comprising the normally solid, crystallizable polypropylene or other polymer, together with a small, effective amount of at least one of said alkali metal salts of monosulfonic acids.

In another aspect, this invention comprises improved articles of solid crystalline polypropylene or other similar solid crystalline polymers, prepared by crystallizing a melt of crystallizable normally solid polypropylene or other similar polymer, containing a small, effective amount of at least one of said alkali metal salts of monosulfonic acids.

Several properties of the articles produced from normally solid crystalline polymers according to this invention are improved thereby. The improvement will vary, depending on the particular polymer used, other additives used therewith, the particular compound selected from the group of compounds of the type of alkali metal salts of monosulfonic acids, and the conditions under which the final solidification of the melt takes place.

Generally, it is found that the spherulite dimensions in the crystallized articles produced according to this invention are substantially smaller than they would be in an article produced in identical manner from the same polymer but without using one of said alkali metal salts of monosulfonic acids.

It is also generally found that the clarity of film or of thicker shaped articles produced from compositions according to this invention is substantially improved, compared to that of articles produced in identical manner from the same polymer without one of said compounds of the type of alkali metal salts of monosulfonic acids, particularly when the final cooling step is under non-flow conditions.

The modulus of elasticity of polymer produced according to this invention generally is increased over that of the identical polymer crystallized in identical manner without one of said compounds of the type of alkali metal salts of monosulfonic acids. Similarly, tensile strength and other tensile properties are improved.

One of the advantages of this invention is that injection molding of polypropylene containing an alkali metal salt of monosulfonic acid in accordance with this invention can be successfully carried out over a much wider range of temperature and pressure conditions than in the absence of crystallization modifying compounds. The area of a "molding diagram" for modified polymers, i.e., the area on the plot of cylinder temperature vs. ram pressure which covers satisfactory conditions, is greater than that obtained with unmodified polymer.

Another advantage is that the mixtures according to this invention solidify at a higher temperature than those of identical polymers not containing said compounds of the type of alkali metal salts of monosulfonic acids. Hence, processing can generally be carried out in a shorter period of time. Another advantage of this invention is that it is possible to apply the process to highly crystalline polymers which have a relatively low melt index, allowing their being processed at lower temperatures.

It is further often found that impact resistance is greater in articles produced according to this invention than in those identically produced from identical polymer without one of said compounds of the type of sodium salts of monosulfonic acids, particularly when the final cooling step is under non-flow conditions.

In the compounds of the type of alkali metal salts of monosulfonic acids, the preferred metal used is sodium. Salts of lithium, potassium, rubidium and cesium, are similarly effective.

The sulfonic acids whose alkali metal salts are effective in accordance with this invention are members of the group consisting of organic sulfonic and aminosulfonic acids. The salts are thus selected from the group consisting of compounds R—SO₃M and

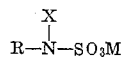

where M is an alkali metal cation, R is an organic group in which the —SO₃M or —NXSO₃M group is attached to a carbon atom, and X is hydrogen, halogen or a hydrocarbon group.

In the salts described above, the sulfonate group or the amino sulfonate group may be attached to a carbon atom of an aliphatic or of a cyclic group. The aliphatic group may contain one or more cyclic groups that may be attached to the carbon atom that also carries the sulfonate or amino sulfonate group, or to another carbon atom of the aliphatic group. Any of the cyclic groups attached to sulfur, nitrogen or carbon may be aromatic, cycloaliphatic or heterocyclic and may carry one or more alkyl or alkenyl groups.

The aforesaid organic groups are preferably hydrocarbon groups of which both the aliphatic and the cycloaliphatic representatives may be saturated or unsaturated and in which the unsaturated bonds may also occur in the rings.

The best results are generally achieved by applying alkali metal salts of sulfonic acids that contain one or more cyclic groups and/or of which the carbon atom attached to sulfur or nitrogen is secondary or tertiary and/or another carbon atom attached to this carbon atom is tertiary or quaternary. The cyclic groups may be attached to the sulfur or nitrogen atoms or to a secondary, tertiary or quaternary carbon atom.

Of the acyclic salts the representatives having at most 12 carbons atoms are preferred. In the salts that contain cyclic groups the number of carbon atoms is preferably not more than 25.

The alkali metal salts used according to this invention also comprise representatives in which one or more of the carbon atoms carry a substituent that is not a hydrocarbon group, for instance a halogen atom, a hydroxyl group, an amino group, an esterified carboxyl group or an ether group.

A wide and at present unexplained variability in effectiveness of members of these broad groups of compounds has been observed. In a study of the effect of sodium salts of a variety of these acids under comparable conditions it was found that sodium sulfonates of unsubstituted aromatic ring compounds, e.g., of benzene or naphthalene, and of compounds having only a single methyl substituent on the ring, i.e., toluene, all showed substantial nucleating activity. Sulfonates of other lower mono- and di-alkyl benzenes and naphthalenes may also be relatively highly effective, particularly where the alkyl group or groups have from one to three carbon atoms per molecule. Compounds RSO₃Na in which R is an alkyl group generally show poor nucleating activity, with the exception of a compound wherein R has the structure

R' being a methyl group. However, substantial nucleating activity may also be observed where R' is ethyl or propyl.

Examples of salts that may be successfully used in the process according to the invention are the alkali metal salts of benzenesulfonic acid, of alpha-toluenesulfonic acid, of para-toluenesulfonic acid, of meta-toluenesulfonic acid, of naphthalene-1-sulfonic acid, of naphthalene-2-sulfonic acid, of phenylsulfamic acid and of 2-methylpropane-2-sulfonic acid.

Of the sulfonates and amino sulfonates applied according to the invention it is generally the representatives that are colorless or substantially colorless that are preferred. By colorless or substantially colorless is meant that in the 1931 chromaticity chart of the "Commission Internationale de l'Éclairage" (see Proceedings 8th Session of the "Commission International de l'Éclairage," Cambridge, England, September 1931, pp. 19–29) the position of the color is within the saturation locus of 10% and that the brightness of the color according to "Color Coordinate Tables (Modified Adam Chromatic Value System) as computed by L. G. Glasser and D. J. Troy" (J. Optical Soc. Am. 42 (1952) 652) is between 0.00 and 30.00.

The alkali metal sulfonates, and also the alkali metal amino sulfonates, may, if so desired, be applied in the form of addition compounds with carboxylic acids, preferably monocarboxylic acids, which are acyclically branched and/or contain cyclic groups. In such monocarboxylic acids the acyclic and/or the cyclic groups may be saturated or unsaturated, while suitable cyclic groups are aromatic, cycloaliphatic and heterocyclic rings.

The salts used are effective in low concentrations and are preferably used in such low concentrations. Suitable concentrations are in the range from 0.01 or less to 5 percent by weight, based on the total mixture. A suitable lower concentration limit is about 0.01 percent. The compounds are preferably employed in concentrations in the range from 0.05 to 2 percent by weight. Although still higher concentrations may be used, no further benefit of the kind described is generally obtained thereby.

The process of this invention may be carried out with a single crystallization modifying compound of the type described, or with a mixture of two or more of such compounds.

If desired, other additives may be present in the olefin polymer. Crystallization modifying additives of other types may be added. Other additives, which are conventionally added, include antioxidants, stabilizers against ultraviolet radiation, and the like. They may be added at any convenient stage of processing.

The present invention is advantageous when used with clear, unpigmented, unfilled polymers. However, the additives of this invention are also compatible with conventional fillers and pigments.

While this invention is most advantageous in providing improved articles of crystalline polypropylene it may also be employed with advantage in improving products made from other crystallizable hydrocarbon polymers, particularly alpha-olefine polymers and copolymers. Specific examples are linear polymers of ethylene, 1-butene, 4-methyl-1-pentene, and 1-hexene, crystalline copolymers of propylene with ethylene, 1-butene and the like, and crystalline polystyrene. Particularly desirable improvements are obtained, for example, in block polymers, such as those consisting predominantly of isotactic polypropylene having small amounts of ethylene, e.g., between 1 and 10 percent, copolymerized therewith by block polymerization. A preferred group are isotactic polymers of alphamonoolefins having at least 3 and up to 8 carbon atoms per molecule. Polymers of alpha-monoolefins having from 2 to 4 carbon atoms are another preferred group. Polymers which can be improved according to this invention have molecular weights and crystallinites in the range described above for polypropylene.

In one mode of practicing this invention, elastomeric polymer is added to the polyolefin as a property-modifying additive, together with a sulfonic acid salt. The addition of elatomers confers an improvement in some of the mechanical properties of crystalline polymers, e.g., the impact strength. Suitable elastomers in general are predominantly amorphous polymers having a glass transition point of less than 10% C., measured according to ASTM test D1043–51. Suitable elastomers include as a preferred group rubbery copolymers of ethylene with alpha-olefins such as propylene or 1-butene, or other elastomeric olefin copolymers, including ter-polymers of two monoolefins and a diolefin, e.g., dicyclopentadiene, and amorphous homopolymers of monoolefins, such as amorphous polypropylene. Other elastomers may be used, such as natural rubber, polyisobutylene, butyl rubber, butadiene-styrene copolymers (SBR), butadiene-acrylonitrile copolymers (NBR), polybutadiene or polyisoprene, particularly those of high cis-1,4 content, silicone rubbers, and the like. The elastomers which are added preferably have weight average molecular weights in excess of 50,000, suitably from 100,000 to 500,000. Elastomer may be added in concentrations up to 35 percent by weight, as a rule not more than 20 percent, and preferably between 3 and 15 percent. Use of sulfonic acid salts together with elastomers provides polymer of improved properties, particularly low temperature (0° C.) impact resistance.

The polymers which are modified according to this invention are produced by polymerizing propylene or other suitable olefins by contact with a highly stereospecific catalyst system. A great variety of stereospecific catalysts have been described in the literature. They are generally species or modifications of the so-called Ziegler catalysts or Natta catalysts.

The Ziegler type catalysts may be designated "metal alkyl-reducible metal halide type," and the Natta type catalysts "preformed metal subhalide type." This terminology is used, for example, in "Polyolefin Resin Processes" by Marshall Sittig, Gulf Publishing Company, Houston, Tex., 1961. These well-known catalysts are the reaction products of halides, in order of preference chlorides and bromides, of transition metals from subgroups b of groups 4 and 5 of the Periodic Chart of Elements, i.e., of Ti, Zr, Hf, V, Nb or Ta, with organometallic reducing agents in which the metal is from groups 1, 2 or 3. Preferred reducing agents are organoaluminum compounds and particularly aluminum alkyls, including aluminum alkyl halides. The most effective catalysts for the production of isotactic polypropylene known to date are those prepared from certain forms of titanium trichloride and certain aluminum alkyls and aluminum alkyl halides.

In the production of crystallizable alpha-olefin polymers, the reaction mixture formed in the low pressure polymerization is treated to deactivate the catalyst, usually by contact with a polar compound such as an alcohol and/or hydrochloric acid, and is subsequently washed for removal of at least a substantial portion of the catalyst residue. The resulting polymer almost invariably contains at least traces of the catalyst residue. Typically it may contain 50 parts per million (p.p.m.) of each of the catalyst components, calculated as the corresponding metal. A carefully purified polymer may contain as little as 1 p.p.m. of each metal or less. The additives of this invention are useful in polymers which contain relatively low amounts of the residue of said catalyst components, e.g., less than 50 p.p.m. calculated as the corresponding metal, and especially in those containing from 0 to 10 p.p.m. However, they provide equally good results when used in polymers containing large amounts of catalyst residue.

Various methods may be employed for introducing the additive of this invention into the polymer. It is generally preferred to add the additive after the polymerization reaction has been completed, the active catalyst has been killed and the predominant part of the catalyst residue washed out of the polymer. The additive may, for example, be added to the washed polymerization slurry; the slurry is then dried and a dry mixture of additive and polymer is recovered. Alternatively, additive may be added to the dry polymer either when the polymer is in the form of a powder fluff or in the form of shaped pellets or the like. It is also possible to add the additive to the crystallizable polymer after it has been melted.

Another method of mixing the alkali metal salts with the crystalline polymers is that in which the salts are dissolved in water, these solutions being mixed with the crystalline polymers, the salts then being precipitated with the aid of a salting-out agent, for instance acetone. The water and the salting-out agent are subsequently removed by mechanical means, for instance by filtration or centrifuging.

It is essential for effective results that a substantially homogeneous distribution of the additive in the molten polymer be obtained prior to the final crystallization of the polymer. To promote mixing of the polymer and the additive it is best to apply mechanical mixing at temperatures at which the polymer has a relatively low viscosity, i.e., a temperature exceeding the melting temperature of the polymer by from 20° to 150° C. These conditions are particularly important when products of greatly enhanced transparency are desired.

The additives may be present in the polymer melt in true solution or in uniform dispersion, e.g., as colloidal suspensions of liquids or solids. In one mode, extreme effectiveness is obtained by using them as solids of from 0.01 to less than 1 micron diameter.

An essential step in the process according to this invention is the cooling of the polymer containing the sulfonic acid salts as additive at conditions resulting in a crystalline polymer structure. The final cooling step in the production of a shaped article determines those of its effective properties which depend on crystal structure. Whereas in the absence of crystallization modifying additives slow cooling leads to formation of excessively large spherulites, and rapid cooling tends to lead to incompletely crystallized polymer, i.e., polymer having a lower degree of crystallinity than it is capable of achieving, the use of additives of this invention generally result in a polymer having a high degree of crystallinity and a fine spherulite structure regardless of whether the cooling is carried out very rapidly or over a relatively longer period of time. Rapid cooling can be carried out as quickly as heat conduction permits. This is, of course, a function of the geometry and heat removal capacity of each system. It can be completed in seconds in the production of film. Slow cooling may be carried out over a period from several minutes to several hours.

Cooling of the polymer mixture can take place in any suitable apparatus. Cooling is usually carried out in conventional apparatus associated with the production of shaped articles from olefin polymers.

The manner in which mixing takes place provides a uniform distribution of the crystallization promoting additive in the polymer. This uniform distribution remains substantially unaffected during the crystallization, both when crystallization progresses very rapidly and when there is a considerable temperature gradient, as in the cooling of large objects.

Shaped articles from product according to this invention may be, for example, bars, sheets, films, tapes, granules, rods or flakes, molded or extruded large or small shapes or filament. Shaped articles according to this invention may be manufactured from the mixtures according to this invention by casting, compression molding or injection molding; films may be obtained by blowing or by slit extrusion; filaments, bars, tapes and the like, may be obtained by extrusion. If desired these can be reduced, by chopping, to the form of granules, chips or the like. Flaments can be stretched to obtain further improvement of properties. Other known methods of forming shaped polyolefin articles are equally adapted to use with mixtures according to this invention.

The invention will be further described by reference to the following examples, which are not to be interpreted as limiting the invention but are merely intended to be illustrative of the invention.

EXAMPLE

A number of experiments were carried out, in each case 2 mg. of sodium salt of a sulfonic acid or amino sulfonic acid listed in the table below being mixed with 200 mg. of polypropylene. The mixing was effected in a high-speed vibrating ball mill.

The polypropylene had been prepared in a medium of technical isooctane, using a mixture of gamma-titanium trichloride and aluminum diethyl chloride as the catalyst-forming components. This polymer had a melt index of 1.0, an intrinsic viscosity (measured in decahydronaphthalene at 135° C.) of 3.9 and a solubility in cold hexane of 6% by weight. The polymer also contained $16 \times 10^{-4}\%$ by weight of aluminum $20 \times 10^{-4}\%$ by weight of titanium.

To a sample of each of these powder mixtures and to a 200 mg. sample of the original polypropylene powder were added at room temperature 0.15% by weight of 4,4'-thio-bis(6-tert-butyl metacresol) and 0.6% by weight of dilauryl thiodipropionate.

With 5 mg. of each mixture a film of 0.04 mm. in thickness was pressed at 200° C. between a cover glass and an object glass. The polymer was then allowed to crystallize by letting the microscope preparations thus made cool down in the air. Then, with the aid of a polarization microscope and a photomultiplier the depolarization of linearly polarized light that was caused by the preparations was measured. The photomultiplier was put in the eyepiece-tube and the light intensity striking the photomultiplier was measured, both with crossed and parallel polarizers, a virtually parallel beam of light being applied as the standard condition. Care was taken to ensure that the parts of the preparations to be measured were free of orientation double refraction.

The results of the measurements are recorded in Table 1. The depolarization value $\Delta$ is the quotient of the intensity measured with crossed polarizers and the intensity measured with parallel polarizers. It is expressed in parts per thousand (p.p.t.).

In the case of the preparation in which no alkali salt had been incorporated the depolarization was about 100 p.p.t. On this scale, the lowest values are indicative of the most effective nucleation effect. Values between 10 and 50 show that the product is a fairly good nucleating agent.

It has been shown in studies with a variety of nucleating agents in polypropylene that those for which measurements such as the above show a significant nucleation effect also cause the improvements in mechanical properties described hereinbefore.

Table 1

| Sodium salt of: | $\Delta$ p.p.t. |
|---|---|
| Benzenesulfonic acid | 13 |
| Alpha-toluenesulfonic acid | 13 |
| Para-toluenesulfonic acid | 17 |
| Meta-toluenesulfonic acid | 30 |
| Naphthalene-1-sulfonic acid | 16 |
| Naphthalene-2-sulfonic acid | 20 |
| Phenylsulfamic acid | 30 |
| 2-methylpropane-2-sulfonic acid | 30 |
| 2-naphthylhydrazinomethanesulfonic acid | 25 |
| p-Chlorobenzenesulfonic acid | 40 |

I claim as my invention:
1. The method of producing polypropylene articles which comprises
    (A) dispersing in
        (a) polypropylene having a viscosity average molecular weight of at least 40,000 and a crystallinity of at least 50 percent, as measured by X-ray analysis
        (b) sodium benzene sulfonate in an amount in the range 0.05 to 2 percent by weight, based on the polymer,
    (B) melting the resulting mixture,
    (C) shaping the melt into a desired shape, and
    (D) solidifying the melt by cooling it.
2. The method of crystallizing a crystallizable polyolefin which comprises
    (A) producing a melt of
        (a) normally solid, crystallizable polyolefin from 2 to 8 carbon atoms per molecule, containing
        (b) an effective amount, in the range from 0.01 to 5 percent by weight, of a substantially colorless crystallization modifying alkali metal salt of an acid selected from the group consisting of monosulfonic acids and mono-amino sulfonic acids,
    (B) and solidifying said melt by cooling it.
3. A method according to claim 2 wherein said polyolefin is polypropylene.

4. A method according to claim 2 wherein said polyolefin is a block polymer consisting predominantly of polypropylene and to a minor extent of other alpha-monoolefin polymer.

5. The method of crystallizing crystallizable polypropylene which comprises
   (A) admixing
      (a) normally solid, crystallizable polypropylene
      (b) with an effective amount, in the range of from 0.01 to 5 percent by weight, of a substantially colorless crystallization modifying sodium salt of an acid selected from the group consisting of monosulfonic acids and mono-aminosulfonic acids;
   (B) melting and mechanically working the resulting mixture at a temperature of from 20° to 150° C. above the melting point of the polypropylene, and
   (C) solidifying the melt by cooling it.

6. A method according to claim 5 wherein said acid is benzenesulfonic acid.

7. A method according to claim 5 wherein said acid is alpha-toluenesulfonic acid.

8. A method according to claim 5 wherein said acid is para-toluenesulfonic acid.

9. A method according to claim 5 wherein said acid is a naphthalene sulfonic acid.

10. A method according to claim 5 wherein said acid is phenylsulfamic acid.

11. A method according to claim 5 wherein said acid is 2-naphthylhydrazinomethanesulfonic acid.

12. A polypropylene composition of improved physical properties and reduced spherulite size, comprising
   (a) solid polypropylene having a highly crystalline structure,
   (b) containing an amount in the range from 0.01 to 5 percent by weight of a crystallization modifying alkali metal salt of an acid selected from the group consisting of monosulfonic acids and mono-aminosulfonic acids,
   (c) said salt having been dispersed in a melt of said polypropylene prior to the final solidification step.

13. A composition according to claim 12 wherein said salt is sodium benzene sulfonate.

14. As an article of manufacture,
   (a) shaped, crystalline polypropylene of improved physical properties,
   (b) containing an amount in the range from 0.01 to 5 percent by weight of a crystallization modifying alkali metal salt of an acid selected from the group consisting of monosulfonic acids and mono-aminosulfonic acids;
   (c) said salt having been dispersed in a melt of said polypropylene prior to the final solidification step.

15. An article according to claim 14 wherein said salt is sodium benzene sulfonate.

References Cited

UNITED STATES PATENTS

| | | | |
|---|---|---|---|
| 3,207,735 | 9/1965 | Wijga | 260—94.9 |
| 3,207,736 | 9/1965 | Wijga | 260—94.9 |
| 3,207,939 | 9/1965 | Wales | 260—94.9 |

JOSEPH L. SCHOFER, *Primary Examiner.*

LAWRENCE EDELMAN, *Assistant Examiner.*